US010841109B2

(12) United States Patent
Jin et al.

(10) Patent No.: US 10,841,109 B2
(45) Date of Patent: Nov. 17, 2020

(54) BUNDLING OVER-THE-TOP SERVICES WITH THIRD PARTY SERVICES

(71) Applicant: Verizon Patent and Licensing Inc., Arlington, VA (US)

(72) Inventors: Zhiying Jin, Lexington, MA (US); Seldron D. Geziben, Newton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1522 days.

(21) Appl. No.: 14/460,952

(22) Filed: Aug. 15, 2014

(65) Prior Publication Data

US 2016/0050076 A1    Feb. 18, 2016

(51) Int. Cl.
*H04L 12/14* (2006.01)
*H04L 29/08* (2006.01)
*H04W 4/50* (2018.01)
*H04L 29/06* (2006.01)
(Continued)

(52) U.S. Cl.
CPC ...... *H04L 12/1428* (2013.01); *H04L 12/1475* (2013.01); *H04L 41/5041* (2013.01); *H04L 63/0884* (2013.01); *H04L 63/102* (2013.01); *H04L 67/20* (2013.01); *H04M 15/09* (2013.01); *H04M 15/41* (2013.01); *H04M 15/61* (2013.01); *H04W 4/50* (2018.02); *H04L 41/509* (2013.01)

(58) Field of Classification Search
CPC ............ H04L 12/1428; H04L 12/1475; H04L 41/5041; H04L 41/509; H04L 63/00; H04L 63/0884; H04L 63/102; H04L 67/20; H04W 4/50
See application file for complete search history.

(56) References Cited

U.S. PATENT DOCUMENTS 8,869,207 B1 * 10/2014 Earle ................. H04N 21/4622
725/37
9,569,624 B1 * 2/2017 Nijim ..................... G06F 21/60
(Continued)

OTHER PUBLICATIONS

The Interactive TV Dictionary & Business Index, "The definition of Over-the-top Video—Over-the-Internet Video", http://www.itvdictionary.com/definitions/over-the-top_definition.html, Apr. 6, 2014, 3 pages.

*Primary Examiner* — Jay Huang
*Assistant Examiner* — Courtney Patrice Jones

(57) ABSTRACT

A device may receive a request to access a bundling service that manages access to an over-the-top service provided by an over-the-top service provider. The device may receive information that identifies a third party service provider and a user credential associated with the third party service provider. The third party service provider may be different from the over-the-top service provider, and the third party service provider may not provide the over-the-top service. The device may provide an authentication request, including the user credential, to a third party device associated with the third party service provider. The device may receive an authentication response from the third party device. The authentication response may indicate whether the third party device successfully authenticated the user credential. The device may selectively provide access to the bundling service based on receiving the authentication response.

20 Claims, 13 Drawing Sheets

(51) Int. Cl.
*H04L 12/24* (2006.01)
*H04M 15/00* (2006.01)

(56) References Cited

U.S. PATENT DOCUMENTS

| | | | | |
|---|---|---|---|---|
| 2004/0030615 | A1* | 2/2004 | Ling | G06Q 30/02 |
| | | | | 705/14.73 |
| 2008/0281692 | A1* | 11/2008 | Zhang | G06Q 20/10 |
| | | | | 705/14.16 |
| 2010/0251280 | A1* | 9/2010 | Sofos | H04H 60/31 |
| | | | | 725/14 |
| 2011/0035319 | A1* | 2/2011 | Brand | G06Q 20/10 |
| | | | | 705/44 |
| 2011/0246253 | A1* | 10/2011 | Yu | G06Q 10/00 |
| | | | | 705/7.13 |
| 2012/0079513 | A1* | 3/2012 | Nahata | H04N 21/2668 |
| | | | | 725/5 |
| 2012/0265642 | A1* | 10/2012 | Weinberg | G06Q 20/108 |
| | | | | 705/26.44 |
| 2013/0104202 | A1* | 4/2013 | Yin | G06F 21/42 |
| | | | | 726/5 |
| 2013/0191929 | A1* | 7/2013 | Yin | H04L 63/0815 |
| | | | | 726/28 |
| 2014/0007146 | A1* | 1/2014 | Peterson | G06Q 10/00 |
| | | | | 725/5 |
| 2014/0123159 | A1* | 5/2014 | Phillips | H04N 21/2541 |
| | | | | 725/1 |
| 2014/0298486 | A1* | 10/2014 | Robertson | G06F 21/10 |
| | | | | 726/28 |
| 2014/0347991 | A1* | 11/2014 | Blicker | H04W 24/02 |
| | | | | 370/235 |
| 2015/0382069 | A1* | 12/2015 | Pearlman | H04N 21/4826 |
| | | | | 725/46 |

* cited by examiner

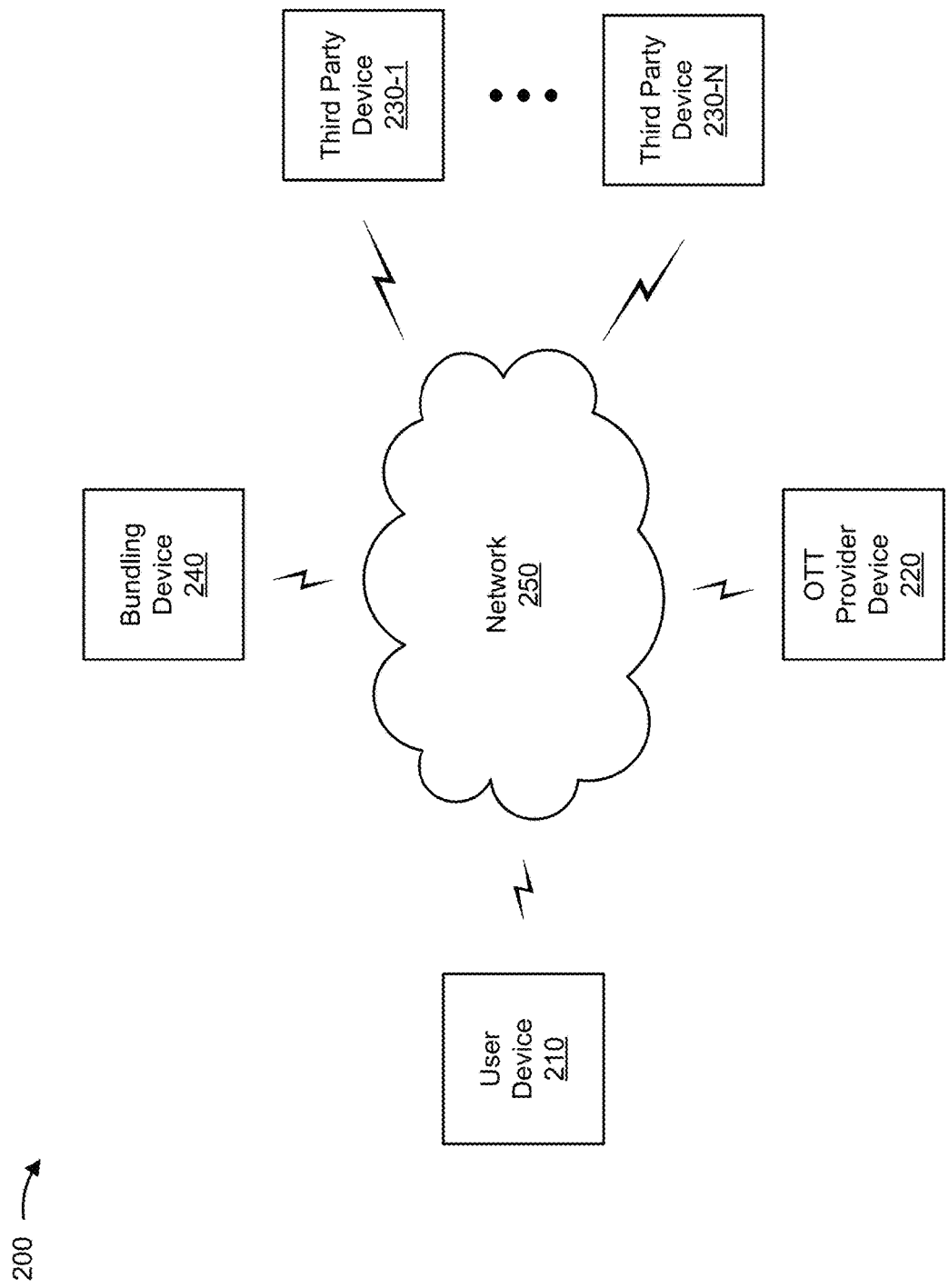

BUNDLING OVER-THE-TOP SERVICES WITH THIRD PARTY SERVICES

BACKGROUND

An over-the-top (OTT) service may refer to a service that is provided over the Internet rather than via a dedicated network of a service provider that provides the service. In other words, an OTT service may refer to a service that is not provided by a network operator, but that is delivered via a network provided by the network operator.

BRIEF DESCRIPTION OF THE DRAWINGS

FIG. 2 is a diagram of an example environment in which systems and/or methods, described herein, may be implemented;

DETAILED DESCRIPTION OF PREFERRED EMBODIMENTS

The following detailed description of example implementations refers to the accompanying drawings. The same reference numbers in different drawings may identify the same or similar elements.

A network operator may provide an over-the-top (OTT) service (e.g., video content, audio content, etc.) via a network operated by the network operator. However, an OTT service provider, that provides the OTT service, may face difficulties in marketing the OTT service to customers, signing up new customers, billing customers, etc. Implementations described herein assist an OTT service provider in marketing OTT services by bundling OTT services with third party services provided by third party service providers. Furthermore, implementations described herein assist an OTT service provider with signing up new customers and billing customers by leveraging third party service providers. For example, customers may be permitted to purchase OTT services without creating a new account with an OTT service provider, without providing billing information to the OTT service provider, etc.

Figure 1A:
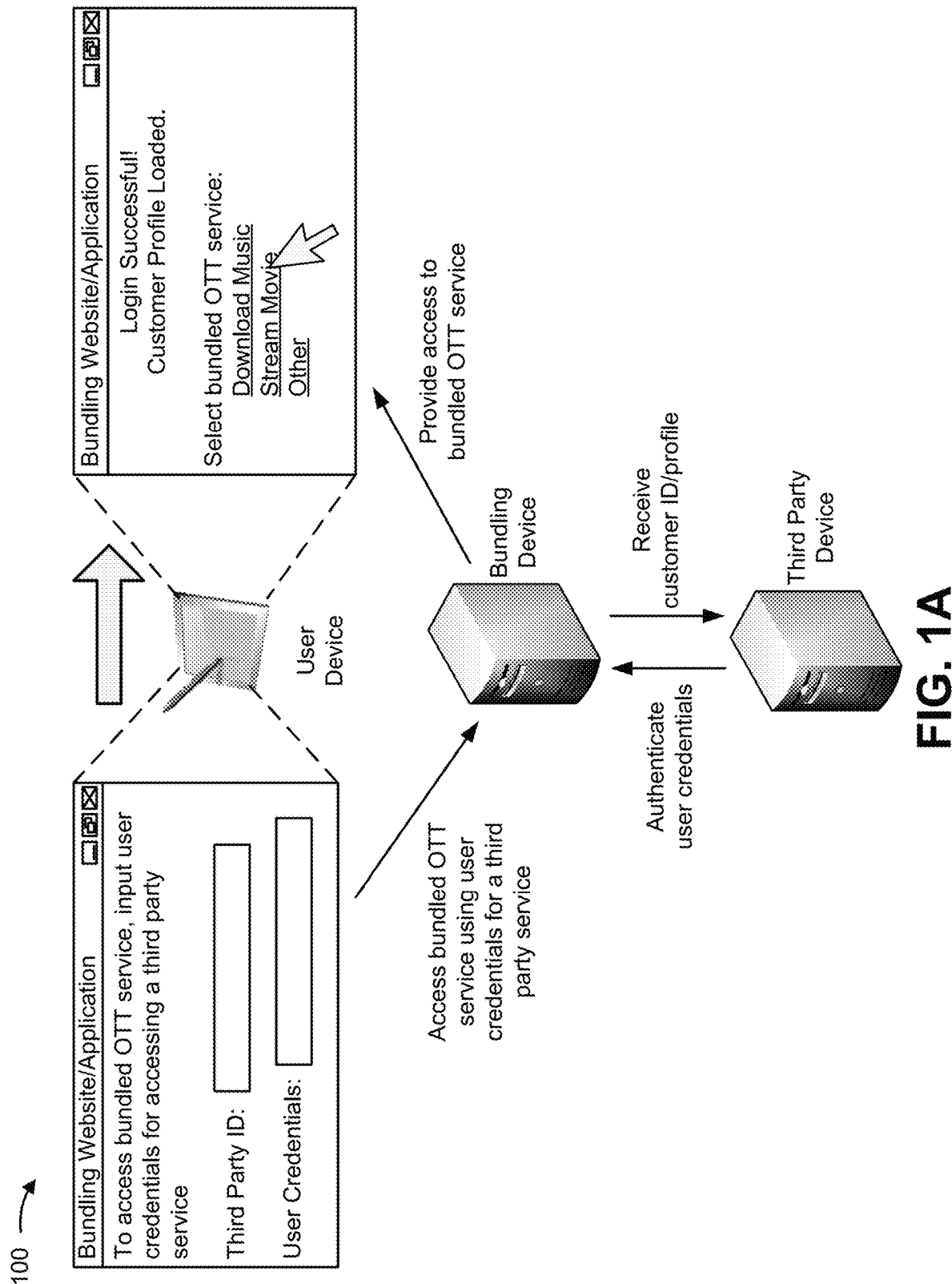
FIGS. 1A and 1B are diagrams of an overview of an example implementation described herein.
Figure 1B:
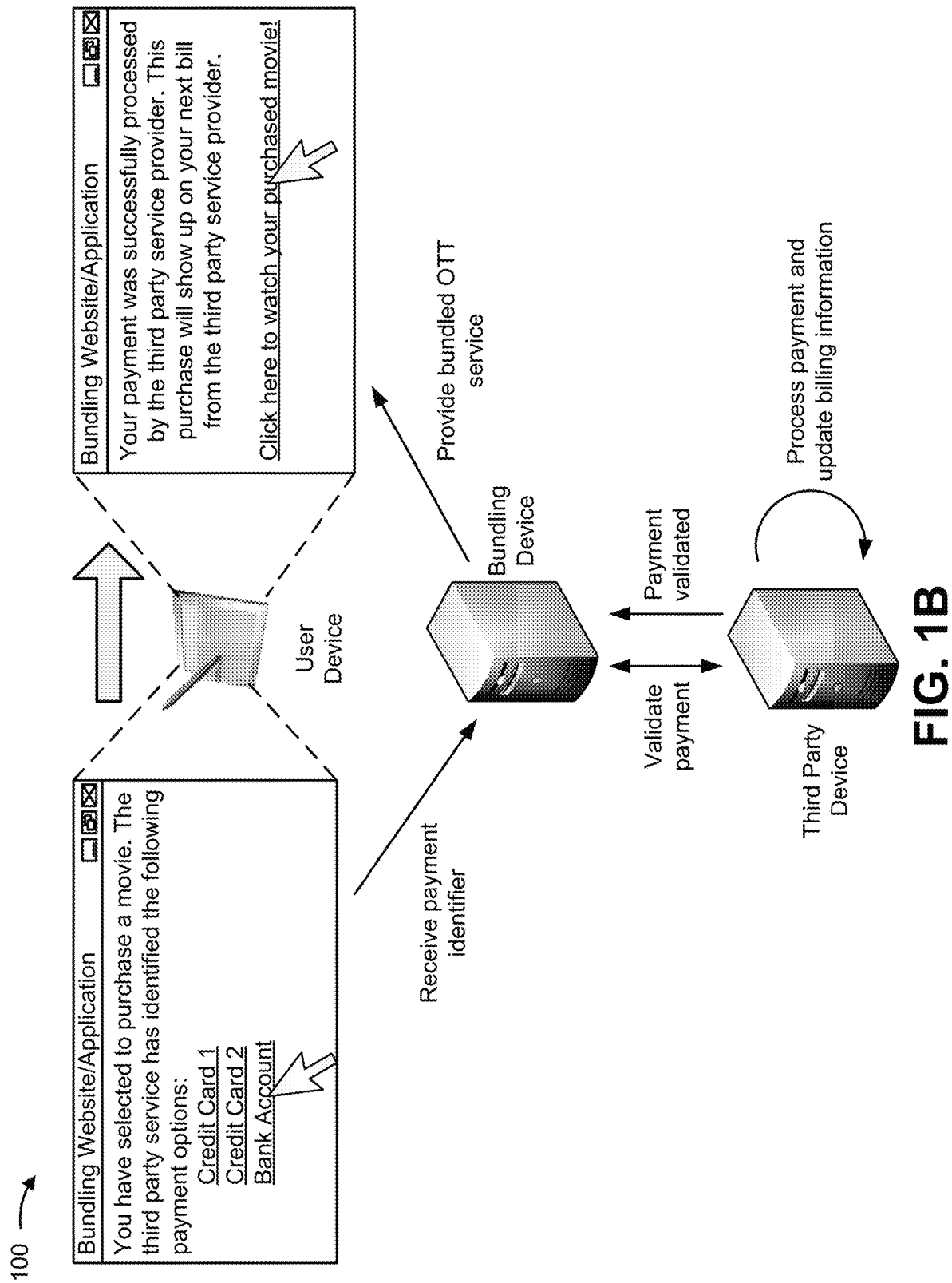

FIGS. 1A and 1B are diagrams of an overview of an example implementation 100 described herein. As shown in FIG. 1A, assume that a user interacts with a user device (e.g., a personal computer, a tablet computer, a gaming device, etc.) to access a bundling service (e.g., via a bundling website, a bundling application, etc.). Assume that the bundling service assists in bundling an OTT service, provided by an OTT service provider, with a third party service, provided by a third party service provider that does not provide the OTT service. For example, assume that the user inputs user credentials used to access the third party service, and that the user device provides the user credentials to a bundling device (e.g., a server device, a traffic transfer device, etc.). Assume that the bundling device communicates with a third party device (e.g., a server device, etc.), associated with the third party service provider, to authenticate the user credentials.

Based on the authentication, assume that the third party device provides a customer identifier and/or a customer profile to the bundling device. Assume that the bundling device uses the customer identifier and/or the customer profile to provide the user with access to a bundled OTT service. For example, and as shown, assume that the bundling device provides, to the user device, information to be displayed via the bundling service. Assume that the user interacts with the bundling service to select a bundled OTT service to be provided. In this way, the user may access bundled OTT services via user credentials associated with a third party service.

As shown in FIG. 1B, assume that the user selects to purchase a movie, and selects a payment option for purchasing the movie. Assume that the payment option was identified in the customer profile provided by the third party device to the bundling device. Based on this selection, assume that the bundling device receives a payment identifier, and communicates with the third party device to validate the payment. Assume that the third party device processes the payment and updates billing information associated with the user. Assume that the bundling device receives an indication that the payment was validated, and provides the purchased OTT service to the user via the user device. In this way, the bundling device need not store sensitive payment information, such as a credit card number or bank account information, and may utilize the third party service provider to bill the user. Thus, an OTT service provider may expand a customer base by leveraging existing customer relationships with third party service providers.

FIG. 2 is a diagram of an example environment 200 in which systems and/or methods, described herein, may be implemented. As shown in FIG. 2, environment 200 may include a user device 210, an OTT provider device 220, a set of third party devices 230-1 through 230-N(N≥1) (hereinafter referred to collectively as "third party devices 230," and individually as "third party device 230"), a bundling device 240, and a network 250. Devices of environment 200 may interconnect via wired connections, wireless connections, or a combination of wired and wireless connections.

User device 210 may include one or more devices capable of receiving, generating, storing, processing, and/or providing information associated with one or more services, such as OTT services, third party services, etc. For example, user device 210 may include a communications and/or computing device, such as a mobile phone (e.g., a smart phone, a radiotelephone, etc.), a desktop computer, a laptop computer, a tablet computer, a handheld computer, a gaming device (e.g., a gaming console, etc.), a set-top box, or a similar device. In some implementations, user device 210 may receive information from and/or transmit information to another device in environment 200. For example, user device 210 may interact with bundling device 240 to provide a bundling service, which may bundle an OTT service, provided by OTT provider device 220, and a third party service provided by third party device 230. User device 210 may receive an OTT service from OTT provider device 220, and/or may receive a third party service from third party device 230.

OTT provider device 220 may include one or more devices capable of providing an OTT service. For example, OTT provider device 220 may include a server device (e.g., a content server, a web server, an application server, a host server, etc.), or a similar device. In some implementations, OTT provider device 220 may provide an OTT service to user device 210 via bundling device 240 and/or network 250. An OTT service may include, for example, an OTT video service (e.g., a streaming video service, a video-on-demand service, a movie service, etc.), an OTT audio service (e.g., a streaming audio service, a radio service, a music service, etc.), or the like. Additionally, or alternatively, the OTT service may include a service that is not provided by a third party service provider associated with third party device 230.

Third party device 230 may include one or more devices capable of providing a third party service. For example, third party device 230 may include a server device (e.g., a content server, a web server, a host server, etc.), or a similar device. In some implementations, third party device 230 may provide a third party service to user device 210 via bundling device 240 and/or network 250. A third party service may include, for example, a cellular service, a rental service (e.g., a digital video disc (DVD) rental service), a television service (e.g., a cable television service, a satellite television service, etc.), a retail service (e.g., an online retail service, a brick-and-mortar retail service), a gaming service, a subscription service, or the like. Additionally, or alternatively, the third party service may be different from the OTT service.

Bundling device 240 may include one or more devices capable of receiving, generating, storing, processing, and/or providing information associated with an OTT service, a third party service, and/or bundling of the OTT service and the third party service. For example, bundling device 240 may include a server device (e.g., a content server, a web server, a host server, etc.), a traffic transfer device (e.g., a router, a gateway, a bridge, a hub, etc.), or a similar device. In some implementations, bundling device 240 may assist in providing user device 210 with access to an OTT service by utilizing customer information associated with a third party service provided by third party device 230.

Network 250 may include one or more wired and/or wireless networks. For example, network 250 may include a cellular network (e.g., a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
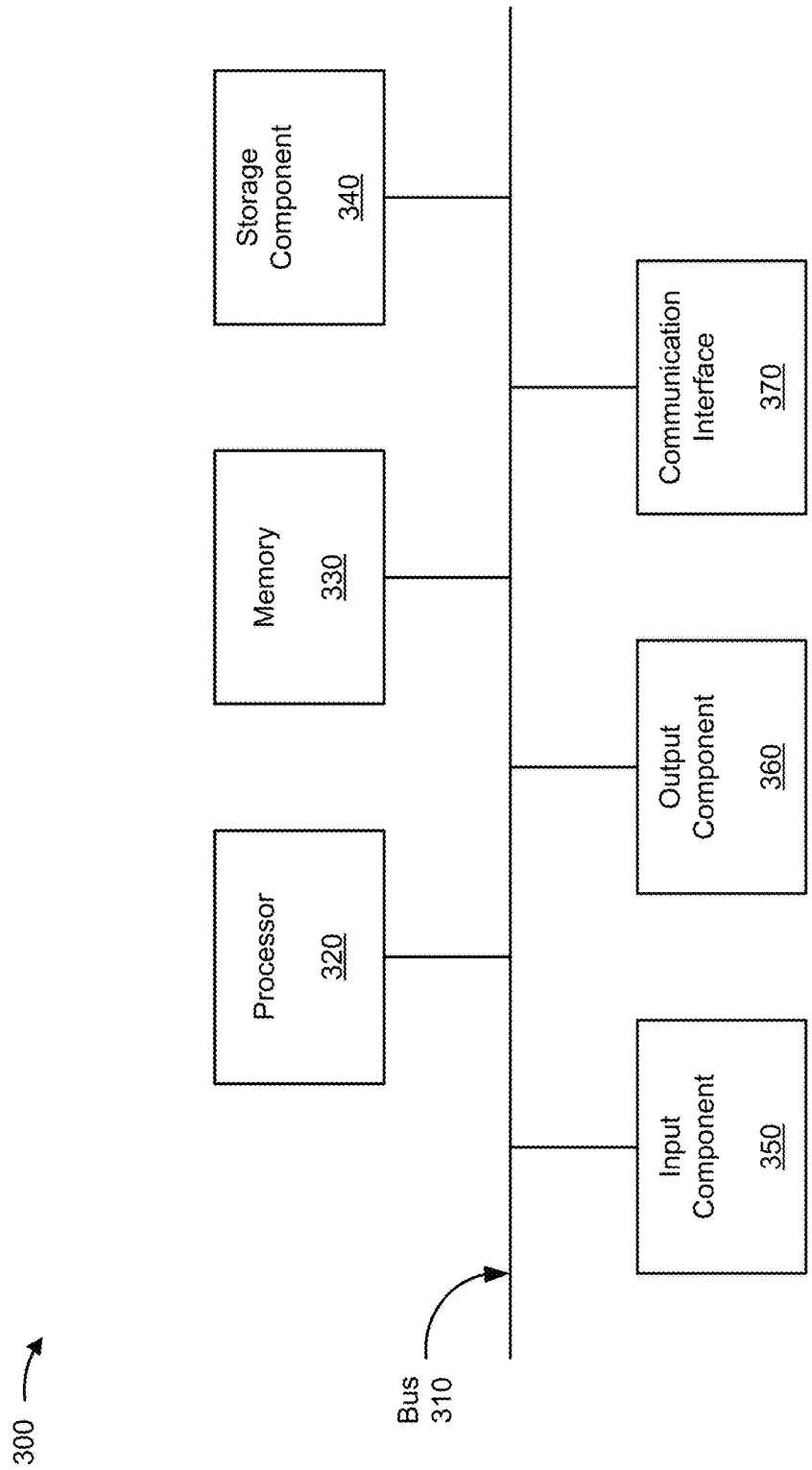
FIG. 3 is a diagram of example components of one or more devices of FIG. 2.

FIG. 3 is a diagram of example components of a device 300. Device 300 may correspond to user device 210, OTT provider device 220, third party device 230, and/or bundling device 240. In some implementations, user device 210, OTT provider device 220, third party device 230, and/or bundling device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
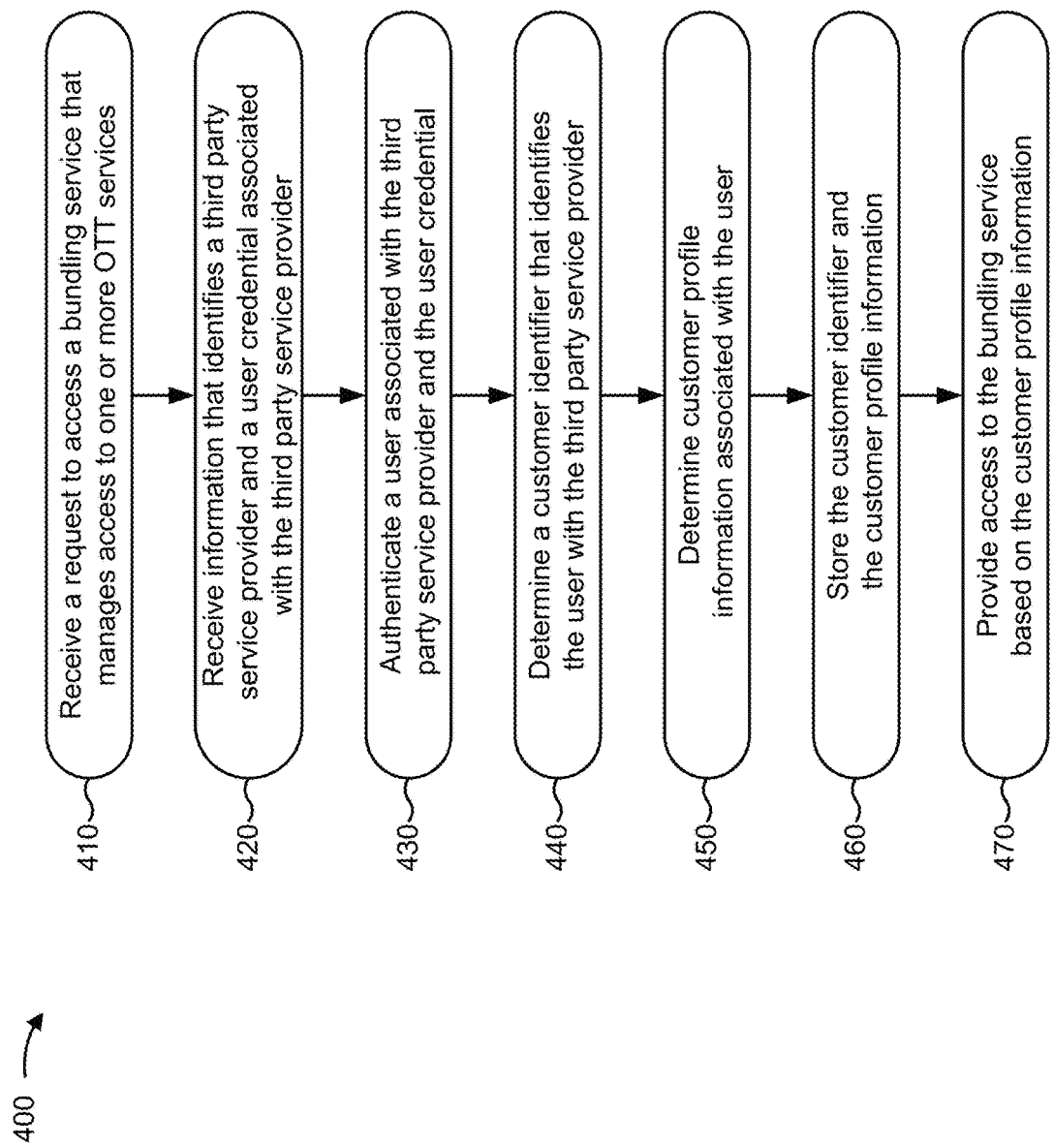
FIG. 4 is a flow chart of an example process for providing access to a bundled OTT service using user credentials associated with a third party service.

FIG. 4 is a flow chart of an example process 400 for providing access to a bundled OTT service using user credentials associated with a third party service. In some implementations, one or more process blocks of FIG. 4 may be performed by bundling device 240. Additionally, or alternatively, one or more process blocks of FIG. 4 may be performed by another device or a group of devices separate from or including bundling device 240, such as user device 210, OTT provider device 220, and/or third party device 230.

As shown in FIG. 4, process 400 may include receiving a request to access a bundling service that manages access to one or more OTT services (block 410). For example, bundling device 240 may receive, from user device 210, a request to access a bundling service. The bundling service may include, for example, a bundling website, a bundling application, or the like. For example, the bundling service may be provided as an application, and bundling device 240 may receive the request, from user device 210, via the application. Additionally, or alternatively, the bundling service may be provided as a website, and bundling device 240 may receive the request, from user device 210, via the website.

The bundling service may manage access to one or more OTT services. For example, the bundling service may permit an OTT service to be accessed using user credentials associated with a third party service provider that does not provide the OTT service (e.g., a third party service provider that provides a third party service other than the OTT service). Additionally, or alternatively, the bundling service may permit an OTT service (e.g., provided via OTT provider device 220) to be bundled with a third party service (e.g., provided by third party device 230). Additionally, or alternatively, the bundling service may permit an OTT service to be provided to a user (e.g., via user device 210), and may permit the user to be billed for the OTT service using billing information associated with the third party service provider. In some implementations, the OTT service may be associated with a first service provider, and the third party service may be associated with a second service provider.

As further shown in FIG. 4, process 400 may include receiving information that identifies a third party service provider and a user credential associated with the third party service provider (block 420). For example, bundling device 240 may receive, via the request to access the bundling service (e.g., a bundling application, a bundling website, etc.), information that identifies a third party service provider and/or a user credential associated with the third party service provider. In some implementations, a user may interact with user device 210 to input information identifying a third party service provider with which the user has an account. Additionally, or alternatively, the user may interact with user device 210 to input a user credential with which the user can access the account with the third party service provider.

In some implementations, the bundling service may provide information that identifies one or more third party service providers that have registered to permit bundling of an OTT service. The bundling service may provide this information for display via user device 210, and a user may select a particular third party service provider identified by the bundling service. Bundling device 240 may receive, from user device 210, information that identifies a third party service provider. Additionally, or alternatively, bundling device 240 may receive, from user device 210, information that identifies a user credential for accessing a third party service provided by the third party service provider. The user credential may include, for example, one or more of a username, a password, a user identifier, a network address associated with user device 210, an account name, or the like.

As further shown in FIG. 4, process 400 may include authenticating a user associated with the third party service provider and the user credential (block 430). For example, bundling device 240 may authenticate the user based on the identified third party service provider and the user credential(s). In some implementations, bundling device 240 may authenticate the user by identifying a particular third party device 230 associated with the identified third party service provider. Bundling device 240 may provide the user credential(s) to the particular third party device 240. The particular third party device 240 may authenticate the user using the user credential(s), and may provide, to bundling device 240, an indication of whether the user was successfully authenticated.

For example, bundling device 240 may provide an authentication request (e.g., a single sign-on (SSO) authentication request) to third party device 230. The authentication request may identify the user credential. Third party device 230 may process the authentication request, using the user credential, and may provide an authentication response (e.g., an SSO authentication response) to bundling device 240. If the authentication response indicates that the user credential could not be authenticated, then bundling device 240 may not provide user device 210 with access to a bundled OTT service. If the authentication response indicates that the user credential was successfully authenticated, then bundling device 240 may provide user device 210 with access to the bundled OTT service.

As further shown in FIG. 4, process 400 may include determining a customer identifier that identifies the user with the third party service provider (block 440). For example, bundling device 240 may receive, from third party device 230 and based on authenticating the user, a customer identifier that is used by the third party service provider to identify the user. Additionally, or alternatively, bundling device 240 may determine the customer identifier using a data structure stored by and/or accessible by bundling device 240 (e.g., based on the input user credential and/or information identifying the third party service provider, based on information received from third party device 230, etc.). The customer identifier may include, for example, a unique string of characters to distinguish the customer from other customers, a username, an account identifier, a telephone number associated with the user, an email address associated with the user, etc.

As further shown in FIG. 4, process 400 may include determining customer profile information associated with the user (block 450). For example, bundling device 240 may receive customer profile information from third party device 230, and/or may determine the customer profile information using a data structure stored by and/or accessible by bundling device 240. Customer profile information may include information associated with a user and/or a user account of a third party service provider, such as a name of the user, a physical address associated with the user, an e-mail address associated with the user, a telephone number associated with the user, a transaction history associated with the user, etc. This customer profile information may be received from third party device 230, in some implementations.

In some implementations, customer profile information may include one or more payment identifiers that identify payment mechanisms via which the user may pay for services, such as via a credit card, a debit card, a bank account, etc. In some implementations, a payment identifier (e.g., received by bundling device 240 from third party device 230) may identify a payment mechanism, and may not identify information actually used to charge the user for a purchase. For example, a payment identifier may include "User's Amex Card" rather than an actual credit card number associated with a payment mechanism identified by the payment identifier. In this way, bundling device 240 may be prevented from obtaining and/or storing sensitive payment information, which may be handled by third party device 230.

Additionally, or alternatively, customer profile information may include information associated with providing an OTT service (e.g., an OTT content service, such as an OTT video service, an OTT audio service, an OTT book service, etc.) to the user. For example, the customer profile information may include information that identifies a transaction history associated with the user (e.g., a history of purchased content, a history of viewed content, a history of reviewed content, etc.), information that identifies bookmarks and/or favorites associated with the user (e.g., content that the user marked as a bookmark and/or favorite), parental control settings associated with the user (e.g., blocked content, permitted content, etc.), transaction credits associated with the user (e.g., a quantity of credits that may be used to purchase content), subscriptions associated with the user (e.g., OTT services to which the user is subscribed), entitlements associated with a user (e.g., a right to consume content for a particular time period, a particular quantity of times, on a particular set of devices, etc.), bundling offers associated with the user (e.g., promotions, discounts, free offers, etc. for an OTT service based on user purchases of and/or subscriptions to a third party service), or the like. This customer profile information may be received from OTT provider device 220 and/or third party device 230, in some implementations.

As further shown in FIG. 4, process 400 may include storing the customer identifier and the customer profile information (block 460). For example, bundling device 240 may store an association between a customer identifier, that identifies a customer with a third party service provider, and customer profile information associated with the customer. In some implementations, bundling device 240 may store a unique user identifier for a user based on a third party service provider identifier, that identifies a third party service provider with which the user is registered, and a customer identifier that identifies the user with the third party service provider. Bundling device 240 may store information that indicates a relationship between this unique user identifier and customer profile information associated with the user (e.g., customer profile information for a single third party service provider, customer profile information for multiple third party service providers, etc.).

In some implementations, bundling device 240 may create a unique user identifier for a user (e.g., a customer identifier unique to an OTT service provider), and may use the unique user identifier to link customer profile information, associated with the user, across multiple third party service providers. For example, a user may have different bundling offers associated with different third party service providers (e.g., free video credits, free DVD credits, free television channels, free shipping, discounted services, etc.), may have a different quantity of credits associated with different third party service providers, may have different transaction histories associated with different third party service providers (e.g., three OTT service transactions associated with a first service provider, two OTT service transactions associated with a second service provider, etc.), or the like. In this way, bundling device 240 may organize one or more OTT services for a user.

In this way, bundling device 240 may link a user with one or more third party customer profiles for the user and one or more OTT provider customer profiles for the user. For example, the user may receive a first OTT bundling promotion based on an affiliation with a third party service provider, and may receive a second OTT bundling promotion based on an affiliation with another third party service provider.

As further shown in FIG. 4, process 400 may include providing access to the bundling service based on the customer profile information (block 470). For example, bundling device 240 may provide access to the bundling service. In some implementations, the bundling service may be provided as an application, and bundling device 240 may provide the application, and/or information associated with the application, to user device 210. Additionally, or alternatively, the bundling service may be provided as a website, and bundling device 240 may provide the website, and/or information associated with the website, to user device 210. User device 210 may provide the application and/or the website for display. The bundling service may provide information associated with one or more OTT services, such as customer profile information.

In some implementations, a user may purchase a bundled OTT service, and the purchase may be validated, processed, and/or billed by a third party service provider that does not provide the OTT service, as described in more detail elsewhere herein. In this way, an OTT service provider, that provides the OTT service, may quickly expand a customer base (e.g., by eliminating the need for new customers to register for the OTT service).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
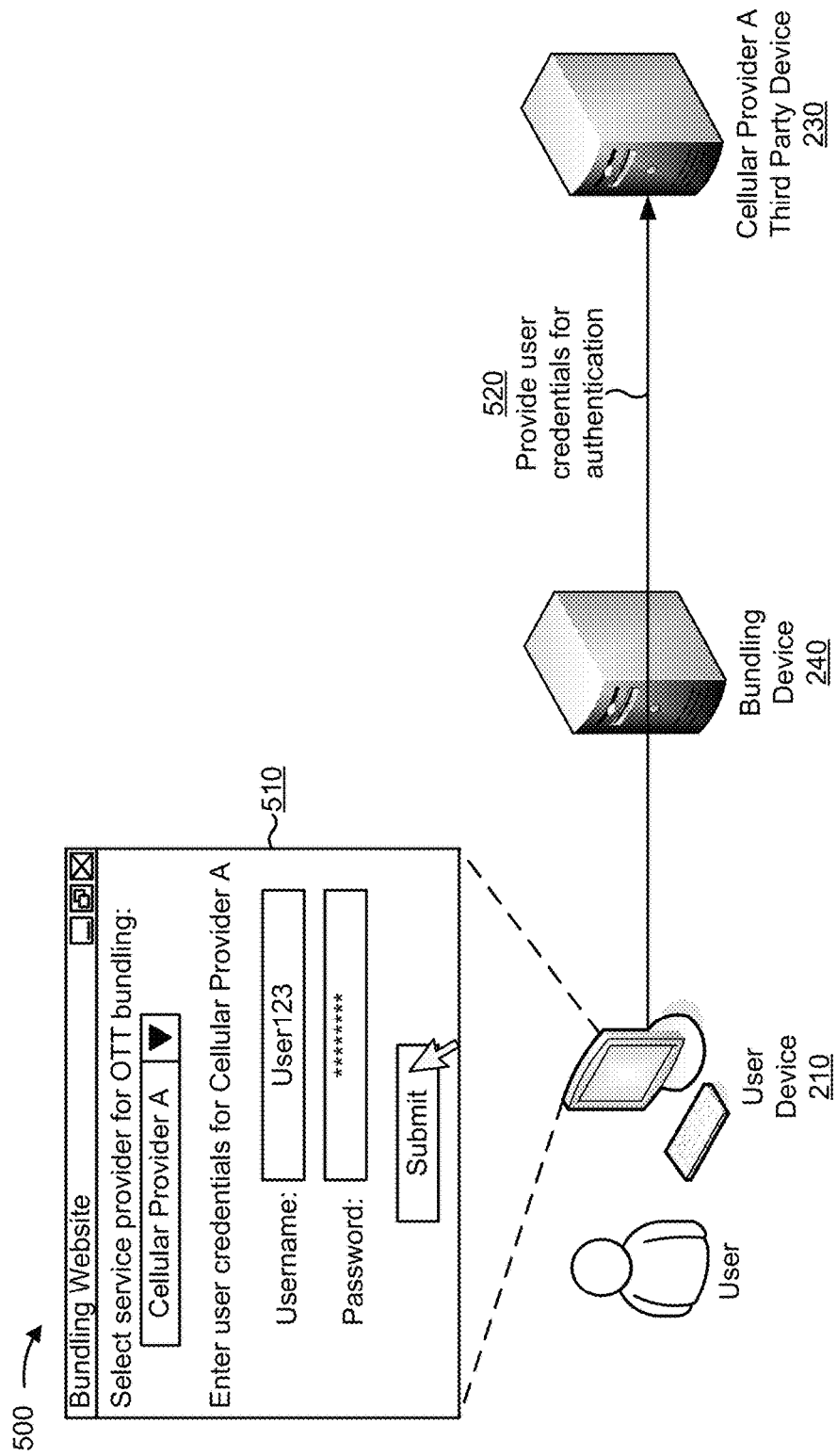
FIGS. 5A-5C are diagrams of an example implementation relating to the example process shown in FIG. 4.
Figure 5B:
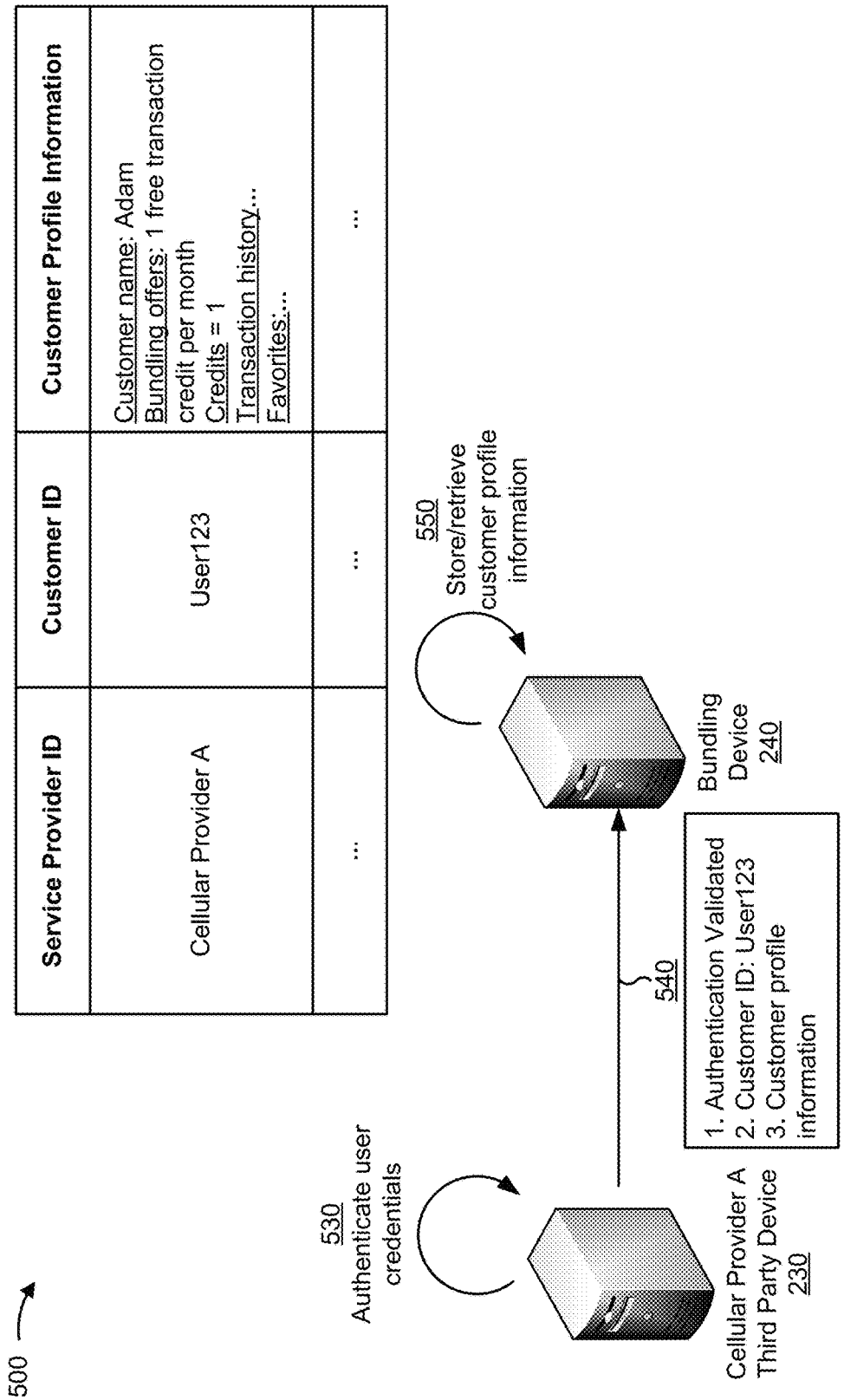
Figure 5C:
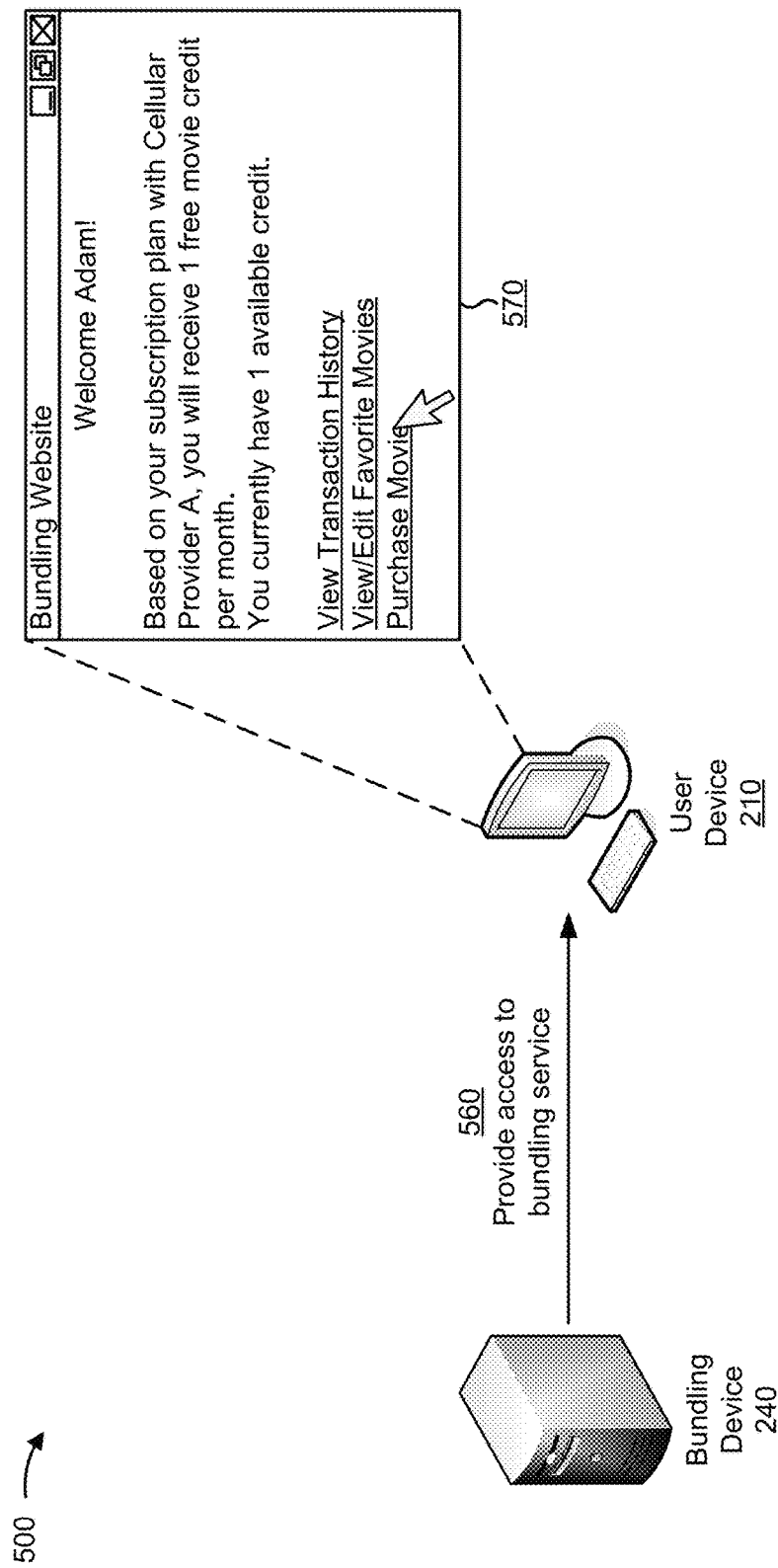

FIGS. 5A-5C are diagrams of an example implementation 500 relating to example process 400 shown in FIG. 4. FIGS. 5A-5C show an example of providing access to a bundled OTT service using user credentials associated with a third party service.

As shown in FIG. 5A, and by reference number 510, assume that a user interacts with user device 210 to navigate to a bundling website provided by bundling device 240. As shown, assume that the user interacts with the bundling website to input information identifying a service provider with which the user is registered, shown as Cellular Provider A. Assume that Cellular Provider A provides cellular service, and does not provide content services, such as a movie service. Further, assume that an OTT service provider provides such content services.

As further shown in FIG. 5A, assume that the user interacts with the bundling website to input user credentials for accessing a website associated with Cellular Provider A. For example, assume that the user inputs a username of "User123" and a password. Assume that bundling device 240 receives, from user device 210, a service provider identifier that identifies Cellular Provider A, and information that identifies the input user credentials. As shown by reference number 520, assume that bundling device 240 provides the user credentials to third party device 230, associated with Cellular Provider A, for authentication.

As shown in FIG. 5B, and by reference number 530, assume that third party device 230 successfully authenticates the user using the received user credentials. Further, assume that third party device 230 determines a customer identifier that identifies the user, which in this case is the same as the user's username, shown as "User 123." As shown by reference number 540, assume that third party device 230 provides, to bundling device 240, (1) an indication that the user credentials were authenticated, (2) the customer identifier, and (3) customer profile information associated with the user.

As shown by reference number 550, assume that bundling device 240 stores and/or retrieves customer profile information associated with a unique user identifier for the user. As shown, assume that the unique user identifier includes a combination of a service provider identifier, shown as "Cellular Provider A" and the customer identifier received from Cellular Provider A, shown as "User123." As further shown, assume that the customer information includes a customer name for the user (e.g., "Adam"), a bundling offer associated with Cellular Provider A and the user (e.g., "1 free movie credit per month"), a quantity of transaction credits associated with the user and Cellular Provider A (e.g., "Credits=1"), a transaction history associated with the user (e.g., a transaction history for an OTT service bundled with a cellular service provided by Cellular Provider A), and favorites associated with the user (e.g., content that the user has marked as a favorite).

As shown in FIG. 5C, and by reference number 560, assume that bundling device 240 provides user device 210 with access to a bundled OTT service based on authenticating the user, and further based on the customer profile information. Assume that bundling device 240 provides information that causes user device 210 to update the bundling website based on the customer profile information. For example, and as shown by reference number 570, assume that the bundling website identifies the user (e.g., "Adam"), indicates that the user's subscription plan with Cellular Provider A permits the user to receive one free movie credit per month, identifies a quantity of transaction credits available to the user (e.g., one), permits the user to view a transaction history, permits the user to view and/or edit favorite movies, and permits the user to purchase a movie. The purchasing process will be described in more detail elsewhere herein. In this way, bundling device 240 may leverage a third party service to permit a user to access an OTT service.

As indicated above, FIGS. 5A-5C are provided merely as an example. Other examples are possible and may differ from what was described with regard to FIGS. 5A-5C.

Figure 6:
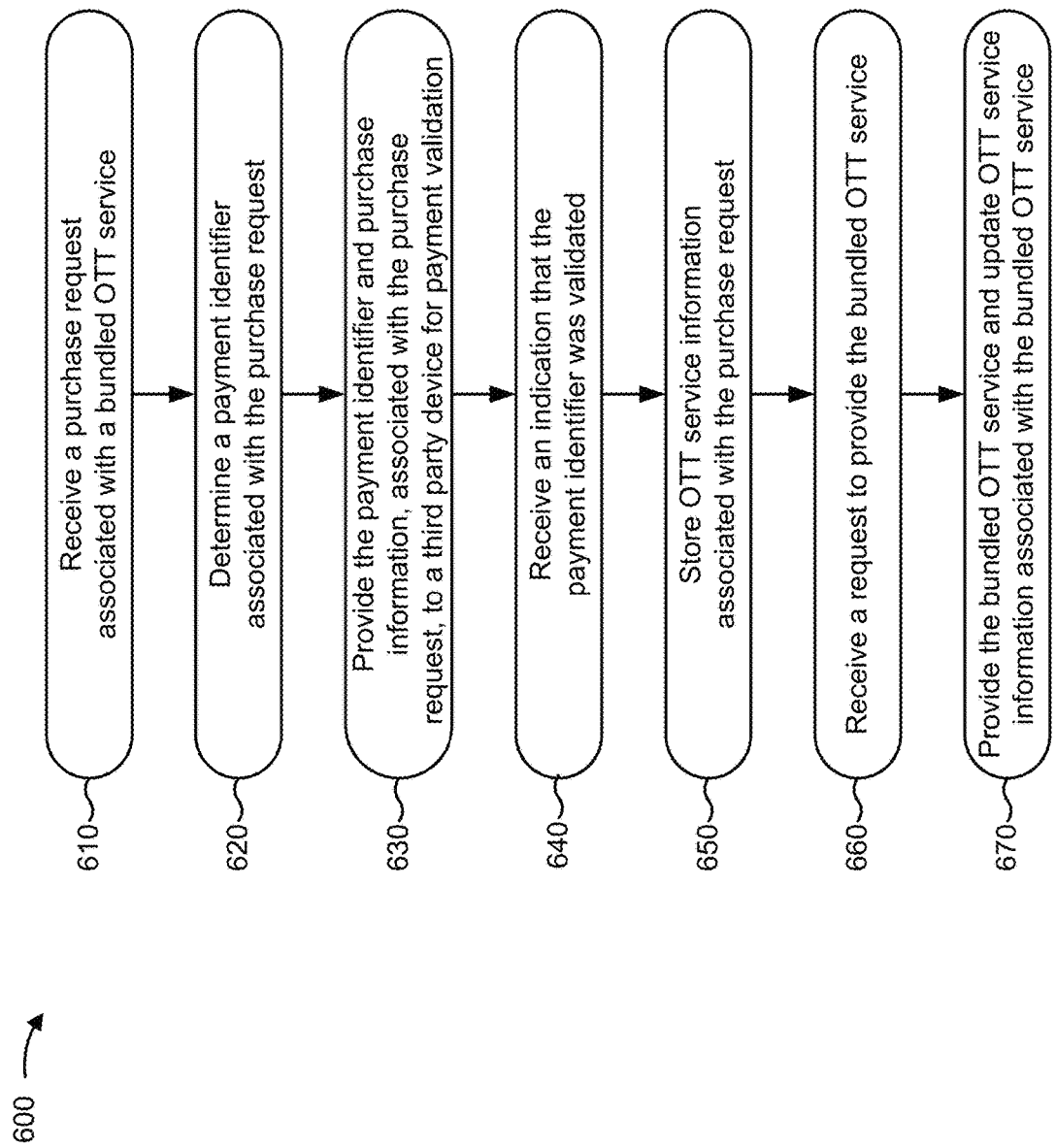
FIG. 6 is a flow chart of an example process for managing a purchase of a bundled OTT service that is bundled with a third party service.

FIG. 6 is a flow chart of an example process 600 for managing a purchase of a bundled OTT service that is bundled with a third party service. In some implementations, one or more process blocks of FIG. 6 may be performed by bundling device 240. In some implementations, one or more process blocks of FIG. 6 may be performed by another device or a group of devices separate from or including bundling device 240, such as user device 210, OTT provider device 220, and/or third party device 230.

As shown in FIG. 6, process 600 may include receiving a purchase request associated with a bundled OTT service (block 610). For example, bundling device 240 may receive a purchase request from user device 210. In some implementations, a user may interact with user device 210 (e.g., via a bundling service, such as a bundling application, a bundling website, etc.) to initiate a purchase of a bundled OTT service (e.g., video content, audio content, etc.). Based on this interaction, user device 210 may send a purchase request, associated with the purchase, to bundling device 240. In some implementations, the purchase may be a one-time purchase, and user device 210 may send an indication of the one-time purchase. Additionally, or alternatively, the purchase may be a recurring purchase, and user device 210 may send an indication of the recurring purchase, which may cause bundling device 240 to trigger a purchase request at a particular time interval.

As further shown in FIG. 6, process 600 may include determining a payment identifier associated with the purchase request (block 620). For example, bundling device 240 may identify, based on information included in the purchase request, a payment identifier that identifies payment mechanisms via which the user may pay for the bundled OTT service, such as via a credit card, a debit card, a bank account, a transaction credit, etc. In some implementations, bundling device 240 may determine one or more payment identifiers associated with a user (e.g., based on customer profile information), and may provide the payment identifier(s) to user device 210. User device 210 may provide the payment identifier(s) for display, and a user may provide input to identify a particular payment identifier in association with a purchase request. User device 210 may provide the particular payment identifier to bundling device 240.

In some implementations, a payment identifier may identify a payment mechanism, and may not identify information actually used to charge the user for a purchase. For example, a payment identifier may include "User's Amex Card" rather than an actual credit card number associated with a payment mechanism identified by the payment identifier. In this way, bundling device 240 may be prevented from obtaining and/or storing sensitive payment information, which may be handled by third party device 230, as described below.

As further shown in FIG. 6, process 600 may include providing the payment identifier and purchase information, associated with the purchase request, to a third party device for payment validation (block 630). For example, bundling device 240 may provide the payment identifier to third party device 230. Third party device 230 may receive the payment identifier, may use the payment identifier to identify information for processing the user's purchase (e.g., a credit card number, a bank account number, a transaction credit number, a gift card number, etc.), and may process the payment using the identified information. In this way, an OTT service provider may utilize a third party service provider to process customer payments.

Additionally, or alternatively, bundling device 240 may provide purchase information to third party device 230. The purchase information may include information associated with the purchase request. For example, the purchase information may identify the user associated with the purchase request (e.g., using a customer identifier of the user), may identify a bundled OTT service associated with the purchase request (e.g., a request to purchase a particular movie, a particular song, etc.), may identify a date and/or time associated with the purchase request (e.g., when the purchase request was sent by user device 210, received by bundling device 240, etc.), a cost associated with the purchase request (e.g., a particular amount of money, a particular quantity of transaction credits, etc.), or the like.

Third party device 230 may use the purchase information to bill a user for the OTT service. For example, third party device 230 may process the purchase, as described above. Additionally, or alternatively, third party device 230 may store billing information associated with the purchase. For example, third party device 230 may update the billing information to include some or all of the received purchase information (e.g., to identify an OTT service that was purchased, a date/time of the purchase, a cost of the purchase, etc.). Third party device 230 (or another device associated with the third party service provider) may use the billing information when providing a bill to the user (e.g., an electronic bill, a paper bill, etc.). In this way, an OTT service provider may utilize a third party service provider to bill users of the OTT service.

As further shown in FIG. 6, process 600 may include receiving an indication that the payment identifier was validated (block 640). For example, bundling device 240 may receive, from third party device 230, an indication that the payment identifier was validated (e.g., that the user's purchase was successfully processed). In this case, bundling device 240 may provide the purchased OTT service, as described below. In some implementations, bundling device 240 may receive, from third party device 230, an indication that the payment identifier was not validated (e.g., that the user's purchase was not successfully processed). In this case, bundling device 240 may not provide the purchased OTT service.

As further shown in FIG. 6, process 600 may include storing OTT service information associated with the purchase request (block 650). For example, bundling device 240 may store and/or may update OTT service information based on the user's purchase. The OTT service information may indicate, for example, that the user has purchased a particular OTT service, which may permit bundling device 240 to provide the particular OTT service (e.g., upon request, as described below). Additionally, or alternatively, the OTT service information may include information that identifies a transaction history (e.g., which may be updated to reflect the purchase), a quantity of available transaction credits (e.g., which may be decremented if a transaction credit was used to purchase the OTT service), an entitlement associated with the purchase (e.g., which may indicate a time period that the user is entitled to access the OTT service), or the like. In some implementations, the OTT service information may be included in customer profile information, described in more detail in connection with FIG. 4.

As further shown in FIG. 6, process 600 may include receiving a request to provide the bundled OTT service (block 660). For example, bundling device 240 may receive, from user device 210, a request to provide the bundled OTT service (e.g., a purchased OTT service purchased by a user). In some implementations, bundling device 240 may provide, to user device 210, an indication that the OTT service has been successfully purchased, and user device 210 may provide an input mechanism to permit the user to access the OTT service. The user may interact with the input mechanism, which may cause user device 210 to transmit, to bundling device 240, the request to provide the OTT service. As an example, the OTT service may include a video streaming service, and the request may include a request to stream a video (e.g., a movie).

As further shown in FIG. 6, process 600 may include providing the bundled OTT service and updating OTT service information associated with the bundled OTT service (block 670). For example, bundling device 240 may receive the request to provide the OTT service, and may provide the OTT service to user device 210 based on the request. For example, bundling device 240 may interact with OTT provider device 220 to cause OTT provider device 220 to provide the OTT service to user device 210 (e.g., to stream a movie). In some implementations, bundling device 240 may verify entitlement information, to ensure that a user has a right to consume the OTT service, before providing the OTT service.

Bundling device 240 may store and/or update OTT service information based on providing the OTT service, in some implementations. For example, bundling device 240 may update the OTT service information to indicate that the OTT service has been provided (e.g., may modify an entitlement, may modify a transaction history, etc.), or the like.

In this way, an OTT service provider may save a user time and may expand a customer base by permitting a user to reuse payment information, billing information, customer profile information, etc., associated with a third party service provider, when requesting and/or receiving an OTT service that is provided by the OTT service provider, but that is not provided by the third party service provider. Furthermore, bundling device 240 may bundle services provided by different sets of third party service providers in a similar manner as described above, thereby creating additional efficiencies for users and service providers.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of managing a purchase of a bundled OTT service that is bundled with a third party service. For the purpose of FIGS. 7A-7D, assume that the operations described herein in connection with FIGS. 5A-5C have been performed.

Figure 7A:
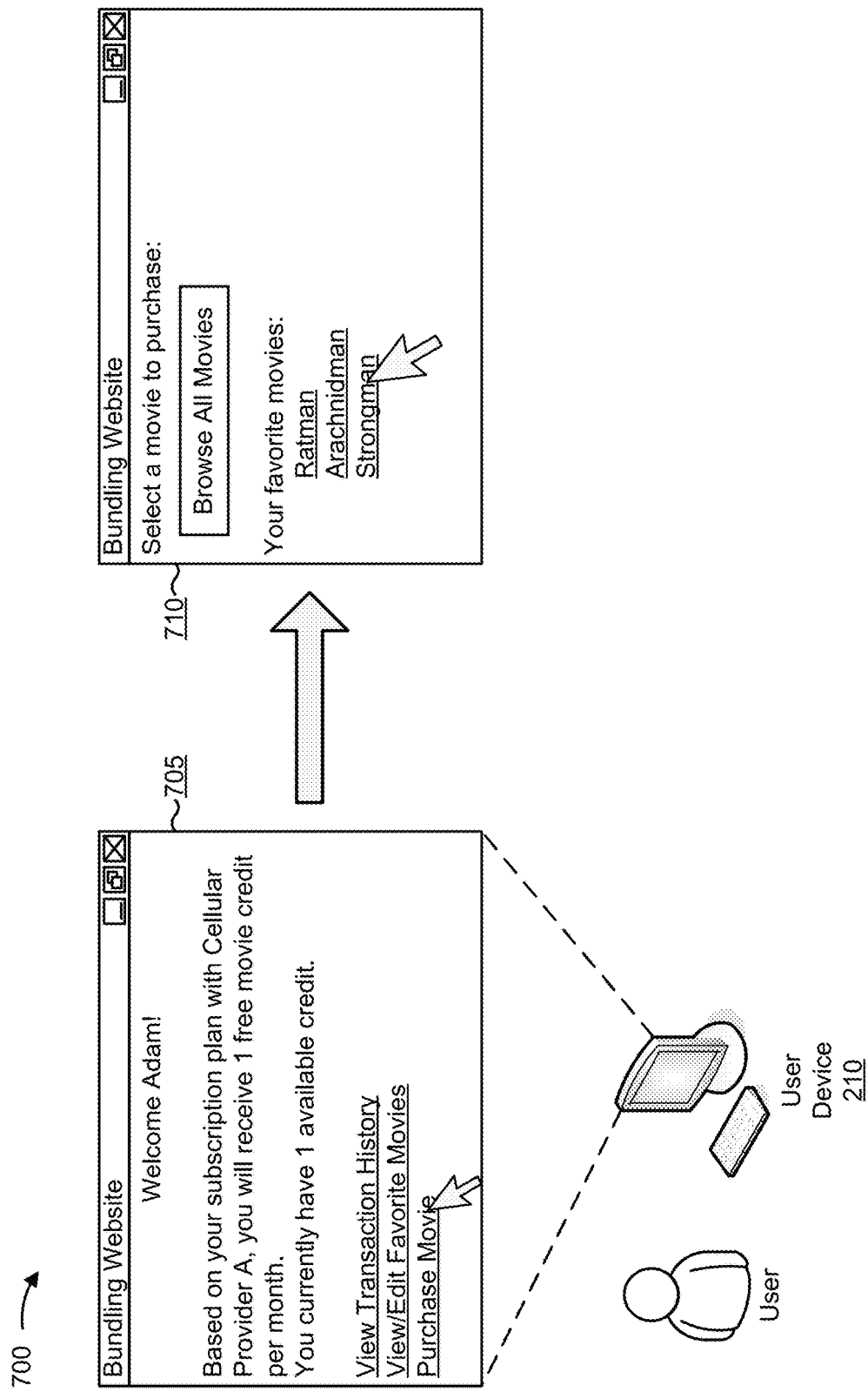
FIGS. 7A-7D are diagrams of an example implementation relating to the example process shown in FIG. 6.

As shown in FIG. 7A, and by reference number 705, assume that a user interacts with user device 210 to purchase a movie, provided by OTT service accessible to user device 210 based on verification of user credentials associated with a third party service provider, as described herein in connection with FIGS. 5A-5C. As shown by reference number 710, assume that the user interacts with user device 210 to provide input requesting the movie "Strongman."

Figure 7B:
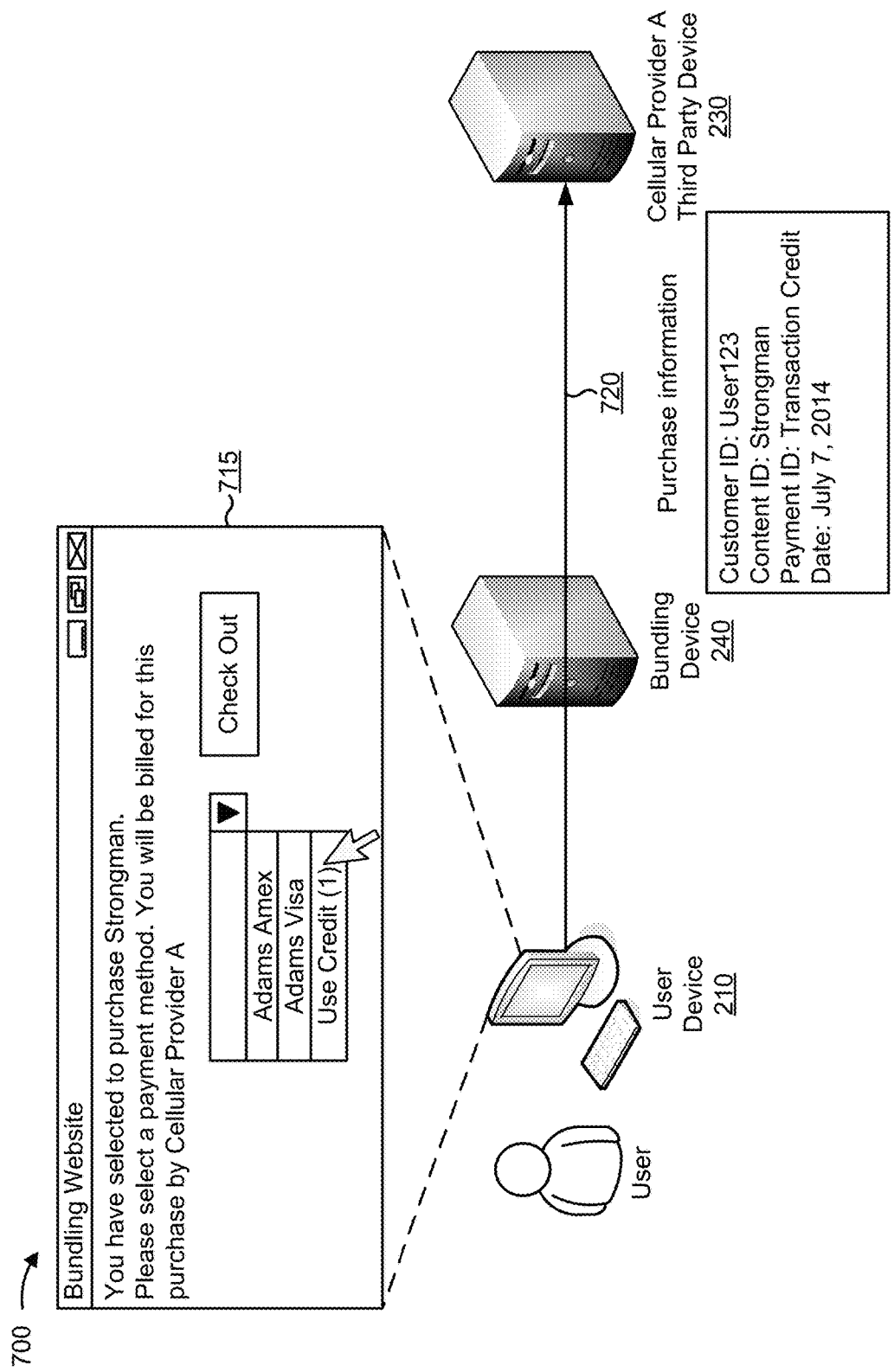

As shown in FIG. 7B, and by reference number 715, assume that user device 210 receives, from bundling device 240, three payment options associated with the user, determined based on customer profile information. The three payment options are shown as "Adam's Amex," "Adam's Visa," and "Use Credit (1)." As shown, assume that user device 210 provides these payment options for display, and that the user interacts with user device 210 to provide input to use a transaction credit for the purchase. Assume that user device 210 provides a purchase request and a payment identifier, that identifies the user input of transaction credit, to bundling device 240.

As shown by reference number 720, assume that bundling device 240 provides, to third party device 230 associated with Cellular Provider A, purchase information associated with the user's purchase. As shown, assume that the purchase information includes a customer identifier associated with the user and Cellular Provider A (e.g., "User123"), a content identifier that identifies the requested content (e.g., "Strongman"), a payment identifier that identifies a payment method for the purchase (e.g., "Transaction Credit"), and a date associated with the purchase (e.g., "Jul. 7, 2014"). Assume that third party device 230 receives this purchase information.

Figure 7C:
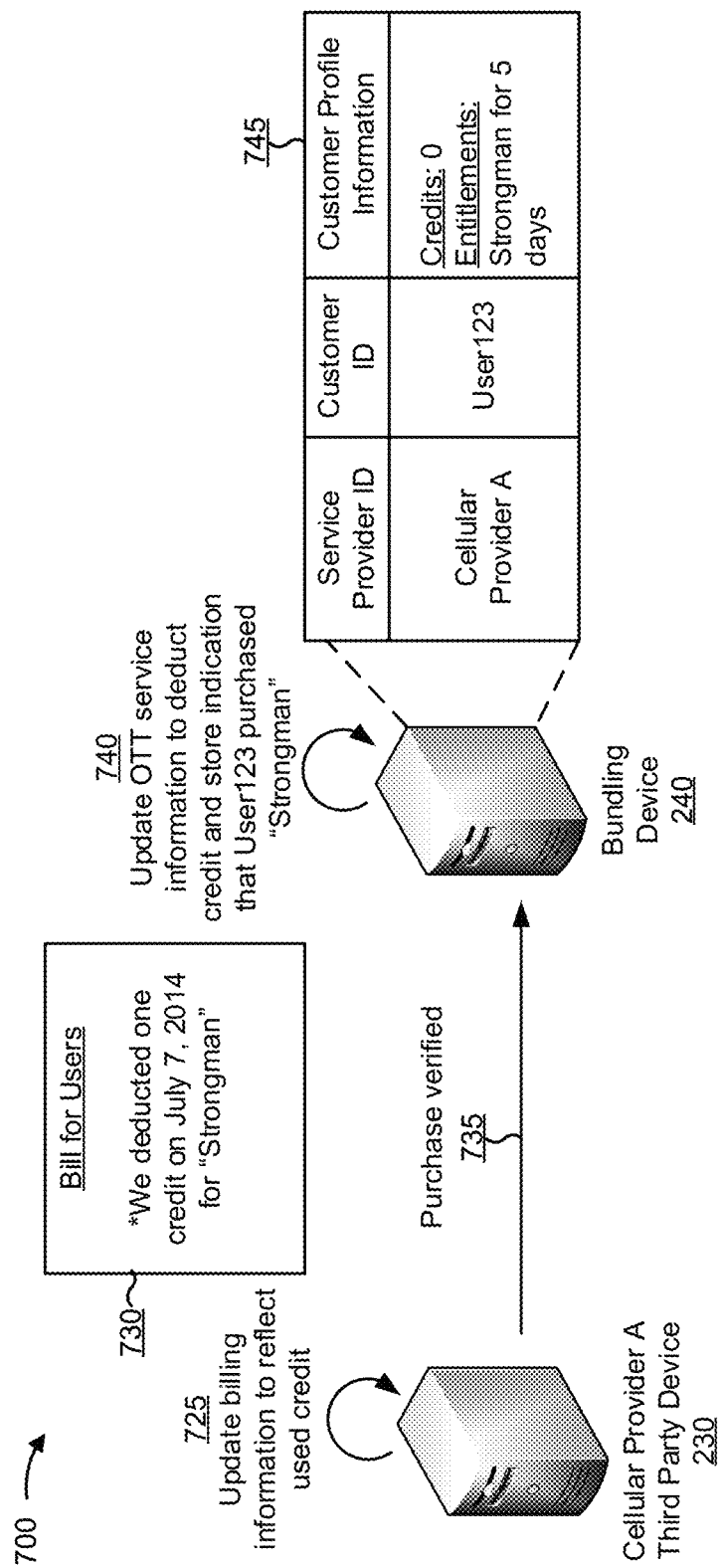

As shown in FIG. 7C, and by reference number 725, assume that third party device 230 updates billing information to reflect the used credit. As shown by reference number 730, assume that third party device 230 updates the billing information to indicate that one credit was deducted for the purchase of "Strongman" on Jul. 7, 2014. In other implementations (e.g., where a user uses a credit card, a bank account, or the like), third party device 230 may communicate with a payment processing device to process the payment, and may update the billing information to indicate a cost of the purchase.

As shown by reference number 735, assume that third party device 230 provides, to bundling device 240, an indication that the purchase was verified (e.g., that the transaction credit was deducted). As shown by reference number 740, assume that bundling device 240 updates OTT service information to deduct the transaction credit and to store an indication that User123 successfully purchased "Strongman." As shown by reference number 745, assume that bundling device 240 updates the OTT service information to indicate that User123, associated with Cellular Provider A, has zero remaining credits, and has an entitlement to stream "Strongman" to user device 210 for 5 days.

Figure 7D:
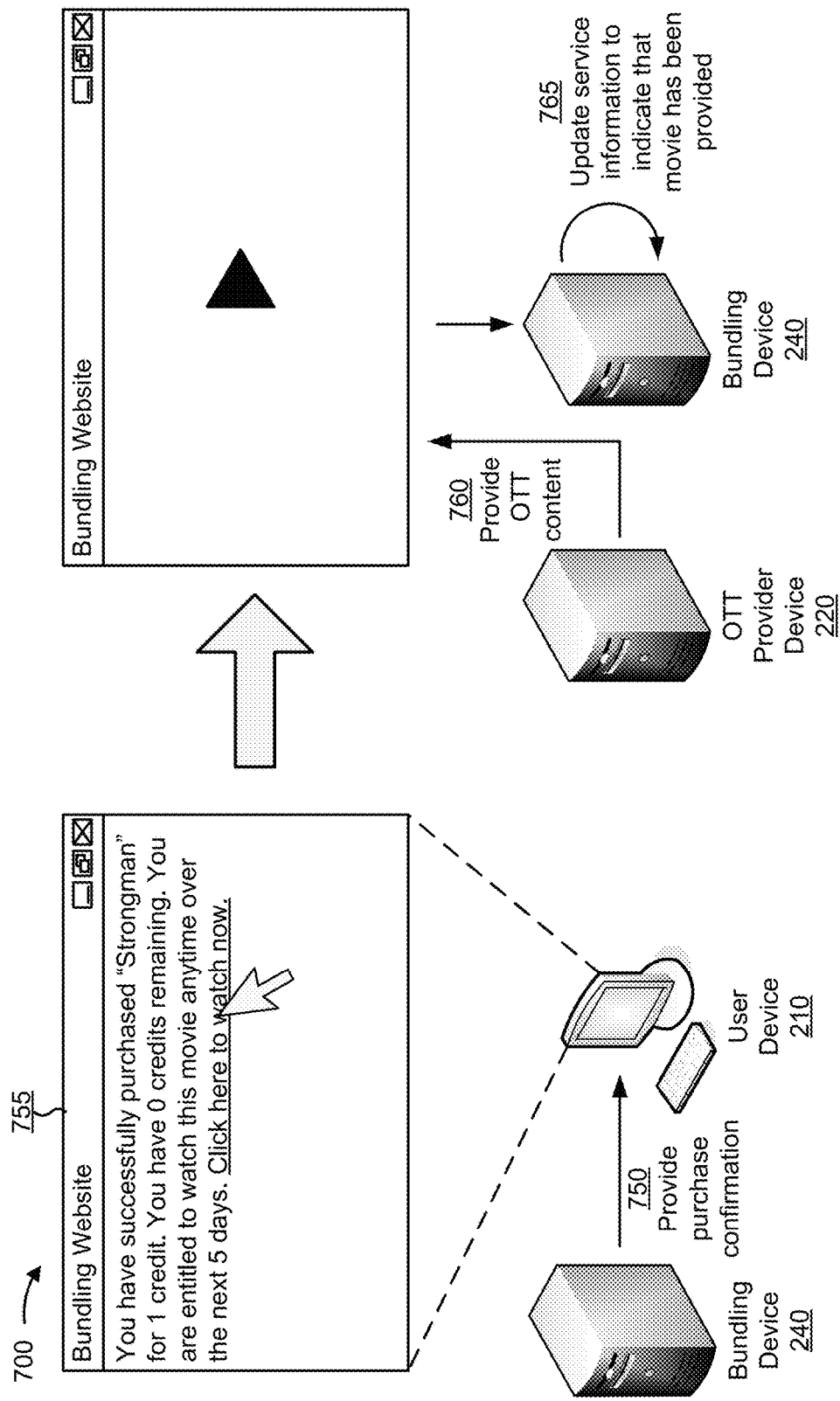

As shown in FIG. 7D, and by reference number 750, assume that bundling device 240 provides, to user device 210, a purchase confirmation indicating that the user has successfully purchased "Strongman." As shown by reference number 755, assume that the user is notified of the successful purchase, the deducted credit, and the entitlement. Assume that the user interacts with user device 210 to request to stream the "Strongman" movie. As shown by reference number 760, assume that bundling device 240 causes OTT provider device 220 to provide the "Strongman" movie to user device 210 (e.g., with or without routing via bundling device 240). As shown by reference number 765, assume that bundling device 240 updates OTT service information to indicate that the movie has been provided to user device 210. In this way, an OTT service provider may leverage a third party service provider to assist in the purchase of an OTT service.

As indicated above, FIGS. 7A-7D are provided merely as an example. Other examples are possible and may differ from what was described with regard to FIGS. 7A-7D.

Implementations described herein assist an OTT service provider in marketing OTT services by bundling OTT services with third party services provided by third party service providers. Furthermore, implementations described herein assist an OTT service provider with signing up new customers and billing customers by leveraging third party service providers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising: one or more processors to: receive, from a user device, a request to access a bundling service that manages access to a plurality of over-the-top services provided by a plurality of over-the-top service providers, the bundling service being provided by the first device; provide, to the user device, information identifying: a first bundling offer associated with providing an over-the-top service, of the plurality of over-the-top services, and billing, by a third party service provider, of a plurality of third party service providers, a user for the over-the-top service, wherein the information identifies a first quantity of available transaction credit, provided by the third party service provider, to be used to access the over-the-top service, and a second bundling offer associated with providing another over-the-top service, of the plurality of over-the-top services, and billing, by another third party service provider, of the plurality of third party service providers, the user for the other over-the-top service, wherein the information identifies a second quantity of other available transaction credit, provided by the other third party service provider, to be used to access the other over-the-top service, the first bundling offer being different from the second bundling offer, and the first quantity being different from the second quantity; provide, to the user device, data enabling the user device to select from the first bundling offer or the second bundling offer; receive information identifying selection of the first bundling offer and a user credential associated with the third party service provider, the third party service provider being different from an over-the-top service provider, of the plurality of over-the-top service providers, that provides the over-the-top service, and the third party service provider not providing the over-the-top service or the bundling service; provide an authentication request, including the user credential, to a third party device associated with the third party service provider; receive an authentication response from the third party device, the authentication response indicating whether the third party device successfully authenticated the user credential; receive, from the third party device, customer profile information associated the third party service provider, the customer profile information indicating at least one payment method associated with the customer profile; provide, to the user device, data requesting user selection of a payment method of the at least one payment method; receive, from the user device, payment data identifying a selected payment method, the selected payment method including the first quantity of available transaction credit; provide access to the bundling service based on receiving the authentication response and the payment data; and provide, to an over-the-top device associated with the over-the-top service, information identifying a particular type of content provided by the over-the-top service.

2. The first device of claim 1, where the one or more processors are further to:
receive a purchase request to purchase the over-the-top service;
provide the purchase request to the third party device, providing the purchase request causing the third party device to process a payment for the over-the-top service using the payment method;
receive, from the third party device, an indication that the payment has been processed; and
provide the over-the-top service based on receiving the indication that the payment has been processed.

3. The first device of claim 1, where the one or more processors are further to:
provide data identifying the payment method to the third party device,
providing the data identifying the payment method causing the third party device to update billing information associated with the user;
receive, from the third party device, an indication that a payment for the over-the-top service has been validated based on providing the data identifying the payment method; and
provide the over-the-top service based on receiving the indication that the payment has been validated.

4. The first device of claim 1,
where the one or more processors, when providing access to the bundling service, are further to:
provide access to the bundling service further based on the customer profile information.

5. The first device of claim 1,
where the one or more processors, when providing the data requesting user selection of the payment method, are further to:
provide the information that identifies the first bundling offer and the second bundling offer.

6. The first device of claim 1, where the one or more processors are further to:
provide an indication, to the third party device, that the over-the-top service has been provided to the user device,
providing the indication causing the third party device, associated with the third party service provider, to bill the user for the over-the-top service.

7. The first device of claim 1, where the over-the-top service is a content service that provides content;
where the one or more processors are further to:
generate a unique user identifier that identifies the user;
determine entitlement information associated with a right, of the user, to receive the content;
store information that indicates a relationship between the unique user identifier and the entitlement information;
and
provide the content to the user device based on receiving the request and further based on the stored information.

8. A non-transitory computer-readable medium storing instructions, the instructions comprising: one or more instructions that, when executed by one or more processors, cause the one or more processors to: receive, from a user device, a request to access a bundling service that manages access to a plurality of services provided by a plurality of service providers, the bundling service being provided by the one or more processors; provide, to the user device, information identifying: a first bundling offer associated with providing a first service, of the plurality of services, and billing, by a third party service provider, of a plurality of third party service providers, a user for the first service, wherein the information identifies a first quantity of available transaction credit, provided by the third party service provider, to be used to access the first service, and a second bundling offer associated with providing a second service, of the plurality of services, and billing, by another third party service provider, of the plurality of third party service providers, the user for the second service, wherein the information identifies a second quantity of other available transaction credit, provided by the other third party service provider, to be used to access the second service, the first bundling offer being different from the second bundling offer, and the first quantity being different from the second quantity; provide, to the user device, data enabling the user device to select from the first bundling offer or the second bundling offer; receive information identifying selection of the first bundling offer and a user credential associated with the third party service provider, the third party service provider being different from a first service provider, of the plurality of service providers, that provides the first service, and the third party service provider not providing the first service or the bundling service; provide an authentication request, including the user credential, to a device associated with the third party service provider; receive an authentication response from the device, the authentication response indicating that the device has successfully authenticated the user based on the user credential; receive, from the device, customer profile information associated with the third party service provider, the customer profile information indicating at least one payment method associated with the customer profile; provide, to the user device, data requesting user selection of a payment method of the at least one payment method; receive, from the user device, payment data identifying a selected payment method, the selected payment method including the first quantity of available transaction credit; provide access to the bundling service based on receiving the authentication response and the payment data; and provide, to a first device associated with the first service, information identifying: the payment method, and a particular type of content provided by the first service.

9. The non-transitory computer-readable medium of claim 8, where the one or more instructions, when executed by the one or more processors, further cause the one or more processors to:
receive, via the bundling service and from the user device, a purchase request to purchase the first service;
provide purchase information, associated with the purchase request, to the device associated with the third party service provider,
the purchase information causing the third party service provider to bill the user for the first service using the payment method;
receive a purchase confirmation indicating that the purchase request was successfully processed; and
provide, based on receiving the purchase confirmation, the first service to the user device,
the first service being provided via another device associated with the first service provider.

10. The non-transitory computer-readable medium of claim 8, where the one or more instructions, when executed by the one or more processors, further cause the one or more processors to:
provide data identifying the payment method to the device;
receive, from the device, an indication that a payment for the first service has been validated by the device; and
provide the first service to the user device based on receiving the indication that the payment has been validated.

11. The non-transitory computer-readable medium of claim 8, where the first service provider is a content provider; and
where the first service includes providing audio content or video content.

12. The non-transitory computer-readable medium of claim 8, where the one or more instructions, when executed by the one or more processors, further cause the one or more processors to:
determine a unique user identifier that identifies the user;
receive, from another device associated with a third service provider, other customer profile information associated with the user and the third service provider, the third service provider being different from the first service provider and the third party service provider, and
the third service provider not providing the first service; and
store information that indicates a relationship between the unique user identifier, the customer profile information, and the other customer profile information.

13. The non-transitory computer-readable medium of claim 8, where the one or more instructions, when executed by the one or more processors, further cause the one or more processors to:
provide information identifying a third bundling offer associated with providing the first service and billing, by another third party service provider, the user for the first service,
the other third party service provider being different from the first service provider and the third party service provider, and
the other third party service provider not providing the first service or the bundling service.

14. The non-transitory computer-readable medium of claim 8, where the one or more instructions, when executed by the one or more processors, further cause the one or more processors to:
provide information identifying a transaction history that identifies a plurality of services provided to the user, the plurality of services including the first service; and
provide information that identifies one or more service providers, other than the first service provider, associated with each of the plurality of services,
the one or more service providers including the third party service provider.

15. A method, comprising: receiving, by a bundling device and from a user device, a request to access a bundling service that manages access to a plurality of over-the-top services provided by a plurality of over-the-top service providers, the bundling service being provided by the bundling device; providing, by the bundling device and to the user device, information identifying: a first bundling offer associated with providing an over-the-top service, of the plurality of over-the-top services, and billing, by a third party service provider, of a plurality of third party service providers, a user for the over-the-top service, wherein the information identifies a first quantity of available transaction credit, provided by the third party service provider, to be used to access the over-the-top service, and a second bundling offer associated with providing another over-the-top service, of the plurality of over-the-top services, and billing, by another third party service provider, of the plurality of third party service providers, the user for the other over-the-top service, wherein the information identifies a second quantity of other available transaction credit, provided by the other third party service provider, to be used to access the other over-the-top service, the first bundling offer being different from the second bundling offer, and the first quantity being different from the second quantity; providing, by the bundling device and to the user device, data enabling the user device to select from the first bundling offer or the second bundling offer; receiving, by the bundling device, information identifying selection of the first bundling offer and a user credential for accessing a service provided by the third party service provider, the third party service provider being different from an over-the-top service provider, of the plurality of over-the-top service providers, that provides the over-the-top service, and the third party service provider not providing the over-the-top service or the bundling service; providing, by the bundling device, an authentication request to a third party device associated with the third party service provider, the authentication request including the user credential; receiving, by the bundling device, an authentication response from the third party device, the authentication response indicating that the third party device successfully authenticated the user credential; receiving, by the bundling device and from the third party device, customer profile information associated the third party service provider, the customer profile information indicating at least one payment method associated with the customer profile; providing, by the bundling device and to the user device, data requesting user selection of a payment method of the at least one payment method; receiving, by the bundling device and from the user device, payment data identifying a selected payment method, the selected payment method including the first quantity of available transaction credit; and providing, by the bundling device, access to the bundling service based on receiving the authentication response and the payment data, the bundling service permitting the user device to receive the over-the-top service from the over-the-top service provider, and further permitting the third party service provider to bill the user for the over-the-top service based on the selected payment method.

16. The method of claim 15, further comprising:
receiving a third party identifier that identifies the third party service provider;
identifying the third party device based on the third party identifier; and
where providing the authentication request to the third party device further comprises:
providing the authentication request to the third party device based on identifying the third party device.

17. The method of claim 15, further comprising:
receiving, from the user device, a purchase request to purchase the over-the-top service;
providing purchase information, associated with the purchase request, to the third party device,
providing the purchase information causing the third party device to process a payment, by the user, for the over-the-top service using the payment method;
receiving, from the third party device, an indication that the payment has been processed; and
providing the over-the-top service to the user device based on receiving the indication that the payment has been processed.

18. The method of claim 15, wherein: the data requesting user selection of the payment method includes an indication that the user has the available transaction credit; and the selected payment method indicates that the available transaction credit is to be used to purchase the over-the-top service; and wherein the method further comprises: providing data identifying the selected payment method to the third party device, providing the data identifying the selected payment method causing the third party device to update billing information, associated with the user, to indicate that the transaction credit was used to purchase the over-the-top service; and providing access to the over-the-top service after providing the selected payment method to the third party device.

19. The method of claim 15, where the over-the-top service includes providing content; and
where the method further comprises:
determining entitlement information that indicates whether the user device is permitted to receive the content; and
providing the content to the user device based on the entitlement information.

20. The method of claim 15, further comprising:
generating a unique user identifier that identifies the user; and
receiving, from another third party device associated with the other third party service provider, other customer profile information associated with the user and the other third party service provider,
the other third party service provider not providing the over-the-top service; and
where the at least one payment method includes another payment method associated with the other customer profile information.

* * * * *